S. W. LEWIS.
FLUSH TANK APPARATUS.
APPLICATION FILED MAY 18, 1920.
1,377,712.
Patented May 10, 1921.
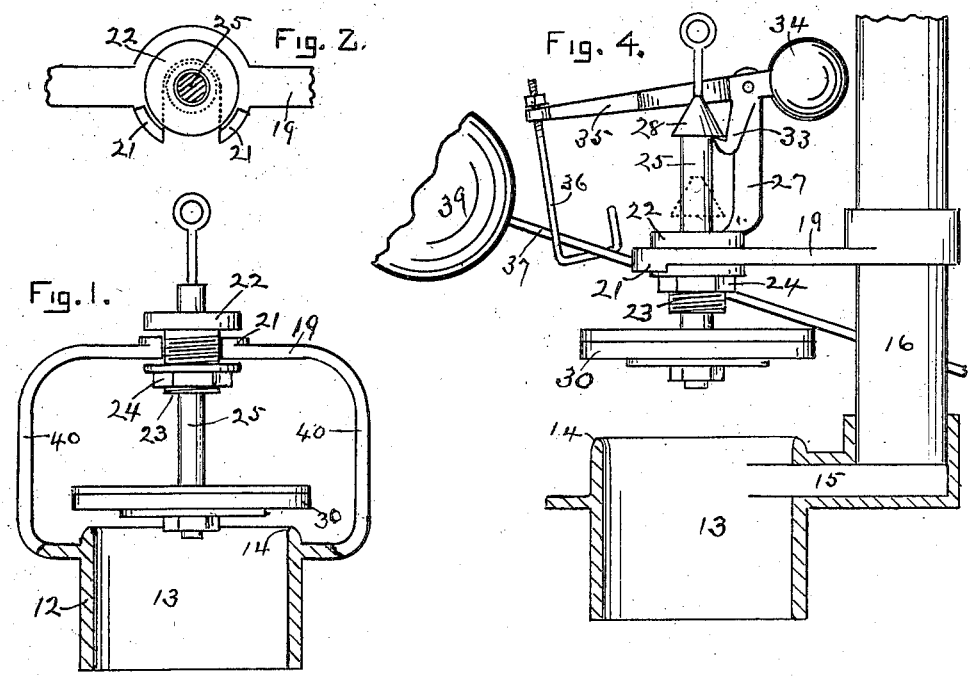
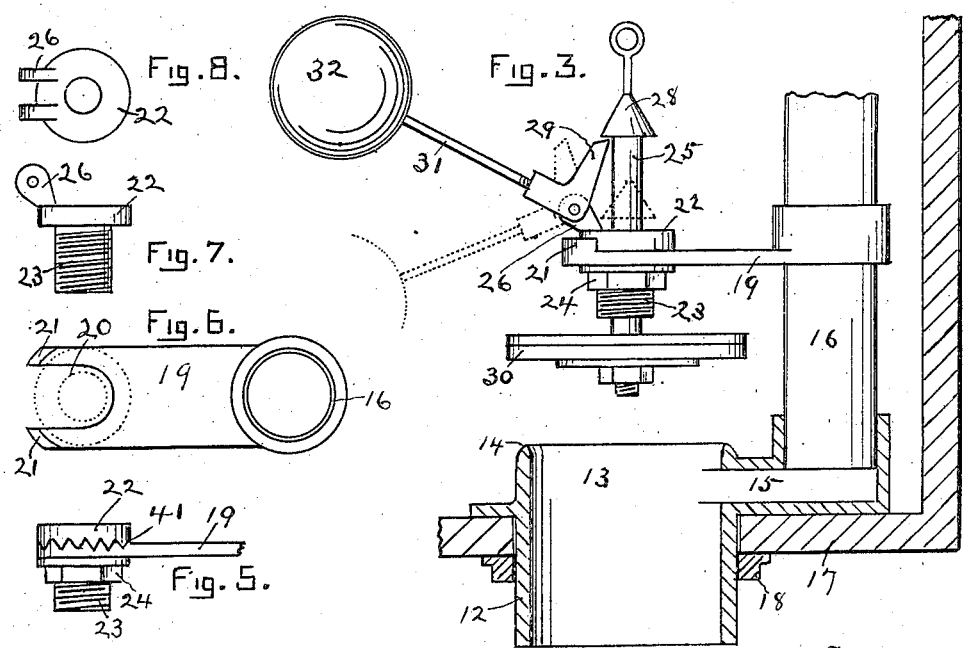
Inventor
Sam'l W. Lewis

UNITED STATES PATENT OFFICE.

SAMUEL W. LEWIS, OF BROOKLYN, NEW YORK.

FLUSH-TANK APPARATUS.

1,377,712.   Specification of Letters Patent.   Patented May 10, 1921.

Application filed May 18, 1920. Serial No. 382,320.

*To all whom it may concern:*

Be it known that I, SAMUEL W. LEWIS, a citizen of the United States, residing at the borough of Brooklyn, in the county of Kings, city and State of New York, have invented certain new and useful Improvements in Flush-Tank Apparatus, of which the following is a specification.

My invention relates principally to flushing tanks or cisterns for water closets and my object is a simple means of assembly and removal of all working parts of the valve independent of and free from the base or body of the valve.

In the accompanying drawing:

Figure 1 is a detail lateral view to show relation of parts and to specifically illustrate the principal features of my invention. Fig. 2 is a plan view of a part of Fig. 1; Fig. 3 is a longitudinal view showing the elements of my invention combined with an automatic, or time valve, construction with the valve held open for the discharge of water. Fig. 4, is a longitudinal view showing similar modified construction, Fig. 5 shows modification of parts illustrated in Fig. 1; Figs. 6, 7, and 8 show various parts in detail.

Throughout the several views, the same figures of reference indicate identical parts.

A valve body, 12, having a discharge outlet 13, and a valve seat, 14, is provided with a support, 19, fixed above the valve seat, the support having a hole or passageway, 20, through it axial with the valve seat. A collar, 22, having its upper end flanged is adapted to rest upon the support, 19, its lower part 23, being of less diameter to pass through the support, 19, and be securely clamped in place by the screwed nut, 24, a valve stem, 25, operating through and guided by the collar and carrying a valve, 30, to close the outlet completes the assembly. The hole or passageway 20, is cut out or open on one side to permit lateral removal of the collar together with all working parts of the valve when the nut, 24, is loosened as shown in Figs. 1 and 2, to prevent accidental displacement of the collar 22 and valve if the nut 24 should become slightly loosened, I preferably provide retaining lugs 21 located at the lateral opening of the passage, 20, whereby to remove the collar and all working parts of the valve it is only necessary to loosen the nut 24 enough to permit the collar 22 to pass over the retaining surfaces as illustrated in Fig. 1, and be as easily replaced. In Fig. 5 the collar 22 and support 19, are shown with reciprocal notched surfaces, 41, which when engaged by the lock nut 24, will hold the parts firmly in place; from these modifications it will be obvious that any similar mechanical means equivalent of either the lugs, 21 or notched engagement 41 would prevent accidental displacement of the collar 22.

Fig. 3, shows the elements of my invention combined with a "time flush" or "automatic valve" in which a valve body 12 is provided with an outlet passage 13, a valve seat, 14, a lateral passage, 15 leading to an overflow 16. The valve body 12 projects through the bottom of a tank 17 and is secured by the lock nut 18, attached to the overflow 16 is a bracket support 19, Fig. 6, having a passage 20 through it axial with the valve seat and open on one side, the support 19 is provided on its upper surface with retaining lugs 21, shown also in Fig. 6, a collar 22, shown also in Figs. 7 and 8 rests upon the bracket support 19 its lower part 23 extending through the laterally open passage 20 and secured by the nut 24, a valve stem 25 operating through and guided by the collar 22 and carrying a valve 30, is provided with a cone 28 on its upper end, the collar Figs. 7 and 8, is provided with a fulcrum 26, a bell-crank 29 is pivoted in the usual way on the fulcrum 26 and a rod or lever 31 connects the bell-crank with a float 32 whose buoyancy, when the valve is raised, causes the bell-crank at 29 to hook under the cone 28 to hold the valve open until the float falling with the discharge withdraws the bell-crank from under the cone, as shown by dotted lines, and releases the valve to automatically close the outlet, by loosening the nut 24 all working parts together with the collar 22 can be removed laterally from the support 19 in the same manner as illustrated in Fig. 1.

The valve shown at Fig. 4 is adapted to operate automatically with the usual supply or "ball-cock" float. The collar 22 is adapted to rest upon the support 19 and be laterally removable with all working parts, from said support. The collar 22 is provided with an elevated fulcrum 27 which carries a lever 35 having a counter-weight 34 and a hooked latch 33. The outer end of the lever 35 is provided with a wire 36 or any convenient means to connect with the float lever 37 of the "ball-cock" float 39, whereby when the valve is raised the weight 34 will throw the latch 33 under the cone 28 which holds the valve open until the falling float pulls down the lever 35 which releases the latch 33 and permits the valve to close. In Fig. 4 the retaining lugs 21 are shown depending from the under side of the supporting bracket 19 reciprocal with the locknut 24.

In Fig. 1, the bracket support 19 is elevated on struts 40, instead of the overflow.

The passageway or hole 20 through the various forms of the support 19 shown on the drawing with one side cut out for the convenient assembling and removal of the guide collar 22, may also be defined and claimed as a forked opening, as shown in Fig. 6, with retaining means such as the lugs 21, on the fork to engage the collar 22, and it might also be termed a recessed passage or recessed opening through the support.

The automatic operations shown in Figs. 3 and 4, have been long known as latch valve constructions and are illustrated to show their adaptability with my invention of a laterally removable valve free from cages or obstructions to the free flow of water and independent of the base or body of the valve structure.

Having described my invention I claim:

1. The combination in a flush tank apparatus, of a valve body having a discharge outlet, a support above the valve body having a passageway through it axial with said outlet, a guide collar within said passage and carrying a valve to close the outlet, said passage being open on one side to permit lateral removal of the collar and valve, substantially as described.

2. The combination in a flush tank apparatus, of a valve body having a discharge outlet through it, a support above the body having a passageway through it axial with said outlet, a collar upon said support and within said passageway and carrying a valve to close said outlet, means to clamp said collar firmly in place, said passageway being open laterally to permit removal of the collar and valve, substantially as described.

3. In a flush tank apparatus, the combination with a valve body having a discharge outlet through it, of a support above said valve body and having a laterally open passageway through it axial with said outlet, retaining means on the support, a collar within the retaining means and the passageway through the support, a valve stem operating through and guided by the collar and a valve carried by said stem to close the outlet, whereby all working parts of the valve together with the collar can be removed laterally from the support substantially as described.

4. In a flush tank apparatus, the combination with a valve body having a discharge outlet through it, of a support above said outlet a laterally open passage way through the support axial with the outlet, retaining means on the support, a collar upon and within the support and retaining means with means to clamp it firmly in place, a valve stem operating through and guided by said collar and a valve carried by the stem to close the outlet, substantially as described.

5. The combination in a flush tank apparatus, of a valve body provided with a valve seat and a discharge outlet through it, a support above said valve seat, an opening through said support axial with said valve seat, said opening being cut out laterally, retaining means on said support, a collar carried by the support and extending through it, a valve stem operating through said collar and carrying a valve to close the outlet, a float, means between said valve stem and said float to hold the valve open and automatically release it, whereby all working parts together with the collar can be assembled and removed from the opening in the support, substantially as described.

6. The combination in a flush tank apparatus, of a valve body having a valve seat and outlet through it, a support above said valve seat, an opening through said support axial with said valve seat, a collar resting upon and within said support and means to hold it in place, a valve stem operating through and guided by said collar and carrying a valve to close the outlet, means carried by the collar to engage and hold the valve open and a float to release the valve and permit it to close as the tank discharges, said opening through the support being cut out at one side, whereby all working parts of the valve together with the collar can be assembled or removed laterally, substantially as described.

SAM'L W. LEWIS.